United States Patent
Spraggs et al.

(10) Patent No.: US 12,261,946 B2
(45) Date of Patent: Mar. 25, 2025

(54) SYSTEM AND METHOD OF CREATING SYMMETRIC KEYS USING ELLIPTIC CURVE CRYPTOGRAPHY

(71) Applicant: SafeMoon US, LLC, Pleasant Grove, PA (US)

(72) Inventors: Lynn Spraggs, Vernon (CA); Robert Spraggs, Coldstream (CA)

(73) Assignee: SafeMoon US, LLC, Pleasant Grove, UT (US)

( * ) Notice: Subject to any disclaimer, the term of this patent is extended or adjusted under 35 U.S.C. 154(b) by 0 days.

(21) Appl. No.: 17/912,393

(22) PCT Filed: Sep. 14, 2022

(86) PCT No.: PCT/US2022/043462
§ 371 (c)(1),
(2) Date: Mar. 23, 2023

(87) PCT Pub. No.: WO2023/043793
PCT Pub. Date: Mar. 23, 2023

(65) Prior Publication Data
US 2024/0214187 A1   Jun. 27, 2024

Related U.S. Application Data

(60) Provisional application No. 63/244,605, filed on Sep. 15, 2021.

(51) Int. Cl.
*H04L 9/08* (2006.01)
(52) U.S. Cl.
CPC ................. *H04L 9/0841* (2013.01)

(58) Field of Classification Search
CPC ........................................... H04L 9/08
See application file for complete search history.

(56) References Cited

U.S. PATENT DOCUMENTS

| | | | | |
|---|---|---|---|---|
| 8,831,992 | B2* | 9/2014 | Price, III | H04L 9/083 |
| | | | | 705/50 |
| 10,819,507 | B2* | 10/2020 | Dewan | H04L 63/0435 |
| 11,128,454 | B2* | 9/2021 | Kim | H04L 9/0852 |
| 11,258,617 | B1* | 2/2022 | Peddada | H04L 9/0838 |
| 11,290,258 | B2* | 3/2022 | Watson | H04L 9/0825 |
| 11,363,409 | B2* | 6/2022 | Sutherland | H04W 12/069 |
| 11,372,986 | B1* | 6/2022 | Doherty | G06F 21/62 |
| 11,588,629 | B2* | 2/2023 | Hebert et al. | H04L 9/30 |
| 11,611,431 | B2* | 3/2023 | Bursell | H04L 9/0825 |
| 11,792,003 | B2* | 10/2023 | Zheng | H04L 9/3242 |
| | | | | 713/193 |
| 11,983,298 | B2* | 5/2024 | Villax | H04L 63/0421 |

(Continued)

OTHER PUBLICATIONS

International Search Report and WIPO written opinion for parallel application PCT/US22/43462, issued Jan. 13, 2023.

*Primary Examiner* — Iral S Lakhia
(74) *Attorney, Agent, or Firm* — William Gray Mitchell

(57) ABSTRACT

A system for generating a symmetric key to allow the sharing of information between two entities, wherein the symmetric key is established from the private key of a first client and the public key of a second client and for use in a symmetric encryption methodology to encrypt information for transport to the second entity, allowing the second entity to form the same symmetric key to decrypt information with no key transport required.

11 Claims, 2 Drawing Sheets

(56) References Cited

U.S. PATENT DOCUMENTS

| | | |
|---|---|---|
| 2008/0130895 A1 | 6/2008 | Jueneman et al. |
| 2017/0083713 A1* | 3/2017 | Simmons .............. H04L 9/0897 |
| 2017/0200324 A1* | 7/2017 | Chennakeshu ........ G07C 5/008 |
| 2017/0244679 A1* | 8/2017 | Kumar .................... H04L 63/06 |
| 2019/0052476 A1 | 2/2019 | Shu et al. |

* cited by examiner

SYSTEM AND METHOD OF CREATING SYMMETRIC KEYS USING ELLIPTIC CURVE CRYPTOGRAPHY

CROSS REFERENCE TO RELATED APPLICATIONS

This application claims priority to International Patent Application PCT/US22/43462, filed Sep. 14, 2022 and thereby to U.S. provisional patent application 63/244,605, filed on Sep. 15, 2021.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable

SEQUENCE LISTING INCLUDED AND INCORPORATED BY REFERENCE HEREIN

Not applicable.

BACKGROUND

Field of the Invention

The disclosure relates to the use of private and public keys for commercial activities. More specifically, the disclosure relates to the formation of symmetric keys using Elliptic Curve methodologies.

Background of the Invention

Cloud computing and storage provide users with the capability to store and process their data in third party data centers. Data communication between users and service provides requires that providers ensure that all critical data (credit card numbers, for example) are masked or encrypted and that only authorized users have access to data in its entirety. Moreover, digital identities and credentials must be protected, as should any data that the provider collects or produces about customer activity in the cloud.

There are numerous security threats associated with cloud data services. This includes traditional threats and non-traditional threats. Traditional threats include network eavesdropping, illegal invasion, and denial of service attacks. Threats specific to cloud computing also include side channel attacks, virtualization vulnerabilities, and abuse of cloud services. To mitigate these threats, security controls often rely on monitoring the three areas: confidentiality, integrity and access controllability. This disclosure concerns access controls.

Access controllability means that a data owner can perform the selective restriction of access to their data outsourced to the cloud. Legal users can be authorized by the owner to access the data, while others cannot access it without permission. Access control can also be referred to as availability. While unauthorized access should be strictly prohibited, partial access for administrative or even consumer uses should be allowed but monitored as well. Availability and access control ensure that the proper level of permissions is granted to the correct persons.

The use of virtual security keys to give private users virtual access to cloud-based or data stored by or on behalf of service providers is known in the commercial marketplace. These keys may be used to exchange information in a secure manner. The users often desire to be able to securely exchange the data without the possibility of a third party being able to intercept the data and recover the information.

An example of such a situation is an accounting firm that needs to send financial information to a client. The institution must first establish a trust relationship with the client and then utilize this trust relationship to send information securely.

Two types of keys are currently used to encrypt and decrypt data shared between users and services providers: asymmetric keys and symmetric keys. Each key is a known type of algorithm, but each type is substantially different in that asymmetric keys are embodied as a private and public key pair whereas, a symmetric key is the same for both encryption and decryption. A private key, in all cases, must be kept secret. Private keys are typically not shared between the sender and receiver of the encrypted sensitive information. Currently, a shared symmetric key is used to encrypt and decrypt the data in systems using public and private keys derived from large prime numbers, such as a Public Key Infrastructure (PKI) type key. Each of a sender and recipient of encrypted information have identical copies of the symmetric key, which each party maintains in secret and does not share with third parties.

In these PKI systems, one of the keys is used to encrypt the data and the other is used to decrypt the data. Traditionally, the public key is shared and is used to encrypt the data and the private key is kept secret and is used to decrypt the data. The problem is that the amount of data that can be encrypted is limited by the size of the modulus of the two keys, wherein a key modulus is the product of two prime numbers used to generate the key pair. A public key with a modulus of 1024 bits can only encrypt a string which is 16 bytes in length. Thus, the PKI system is used to share a symmetric key which can then be used to encrypt any amount of data. It is obvious that the strength of the system is therefore commensurate with the length of the symmetric key that can be shared. It would be preferable to have a system that produced a larger symmetric key.

If symmetric keys are used, then the keys must be the same for both encryption and decryption. Therefore, to effectively use symmetric keys, it is necessary to securely transport the shared key to another party. Thus, a lost PKI private key causes many problems, mostly associated with the necessary revocation of the public key. In order to alleviate this issue in web transactions, current protocols require that the public and private keys be used to share a symmetric key between the two parties. An example of sharing symmetric keys is Secure Socket Layer (SSL).

Using shared symmetric keys removes this restriction, but when using symmetric keys, it also becomes necessary to establish a trust relationship between the two parties in order to share the keys. As a general rule, the symmetric keys are shared using a PKI related system.

The current virtual key methodology solves two problems. First, there is a need for a system allowing parties to exchange data without having to set up a trusted relationship. Second, there is a need for a system to generate public and private keys that are both persistent and easily regenerated. The security system disclosed herein will provide an enhanced level of security with respect to traditional cryptographic functionality, and it removes many of the barriers associated with traditional security, including the need for Certificate Authorities and Revocation Lists. The methodology will provide systems with the ability to secure stored operational data in a manner that only can be accessed by the authorized user and will be impervious to traditional forms of breach attempts. In some cases, the information used by the system will be derived from encrypted data stored on the device rather than from stored data on the device.

BRIEF DESCRIPTION OF THE INVENTION

In a preferred embodiment, A system for generating a symmetric key to be used to encrypt data to be shared by a first client and a second client, the system comprising:
  a first client device with a memory, a processor and an associated local storage;
  a second client device with a memory, a processor and an associated storage;
  a symmetric key generating algorithm and a symmetric key encryption algorithm, each located on the first client device memory and the second client device memory;
  wherein the system executes the following steps;
  1. entering a first client private key and a second client public key into the symmetric key generating algorithm on each of the first client device memory and second client device memory to independently generate the same symmetric key on each device;
  2. securely storing the second client public key on the remote repository;
  3. using the symmetric key encryption algorithm on the first client device to encrypt data;
  4. sending the encrypted data from the first client device to the second client device; and
  5. decrypting the encrypted data using the symmetric key encryption algorithm on the second client device.

In another preferred embodiment, the system as described herein, wherein the symmetric key is derived from a point on the elliptic curve produced by multiplying the first client private key by the second client public key.

In another preferred embodiment, the system as described herein, wherein the symmetric key is a 32 byte hash of concatenated x and y coordinates of the point.

In another preferred embodiment, the system as described herein, wherein step 4 is accomplished using an Internet, an intranet, wired or wireless transfer or a similar known means of electronic data transport.

In another preferred embodiment, the system as described herein, wherein the second client device is a server.

In another preferred embodiment, a method of using the system as described herein, wherein the system executes the following steps:
  1. Retrieving a first client private key and a second client public key from a first client local storage with a first client device;
  2. Using a symmetric key generating algorithm stored in the first client device memory to generate a symmetric key from the product of the first client private key and the second client public key, wherein the symmetric key is derived from a point on the elliptic curve produced by multiplying the first client private key by the second client public key;
  3. Using the symmetric key in a symmetric encryption algorithm stored on the first client device memory to encrypt data;
  4. Sending the encrypted data from the first client device to the second client device via an Internet, an intranet, wired or wireless transfer or a similar known means of electronic data transport;
  5. Retrieving the second client private key and the first client public key from the second client storage with the second client device;
  6. Generating the symmetric key with the second client device as in step 2, wherein the derivation methodology matches the methodology of the first client; and
  7. Using the symmetric key on the second client device to decrypt the incoming message from the first client and thus access the encrypted data.

In another preferred embodiment, the method as described herein, wherein the symmetric key is a 32 byte hash of concatenated x and y coordinates of the point.

In another preferred embodiment, the method as described herein, wherein step 3 is embodied as using the symmetric key to initialize an instance of an AES algorithm and thereby encrypting data.

In an alternate preferred embodiment, a method of using the system as described herein, also comprising a mobile application stored in the memory of the first client device, wherein the system executes the following steps:
  1. Embedding a second client public key into the application on the first client device;
  2. Computing a random first client private key and an associated elliptic curve second public key with the application on the first client device;
  3. Computing a symmetric key from the embedded second client public key and the computed random first client private key with the application on the first client device;
  4. Encrypting data with the application using the symmetric key;
  5. Sending the computed public key and the encrypted data to the second client device associated with the second client public key;
  6. Computing a symmetric key from the second client private key and the incoming first client public key with a copy of the application located on the server; and
  7. Decrypting the encrypted data using the computed symmetric key on the second client device.

In another preferred embodiment, the alternate method as described herein, wherein the mobile application contains the embedded second client public key at the time it is downloaded to the memory of the first client device.

In another preferred embodiment, the alternate method as described herein, wherein step 5 is accomplished using an Internet, an intranet, wired or wireless transfer or a similar known means of electronic data transport.

DETAILED DESCRIPTION OF THE INVENTION

Figure 1:
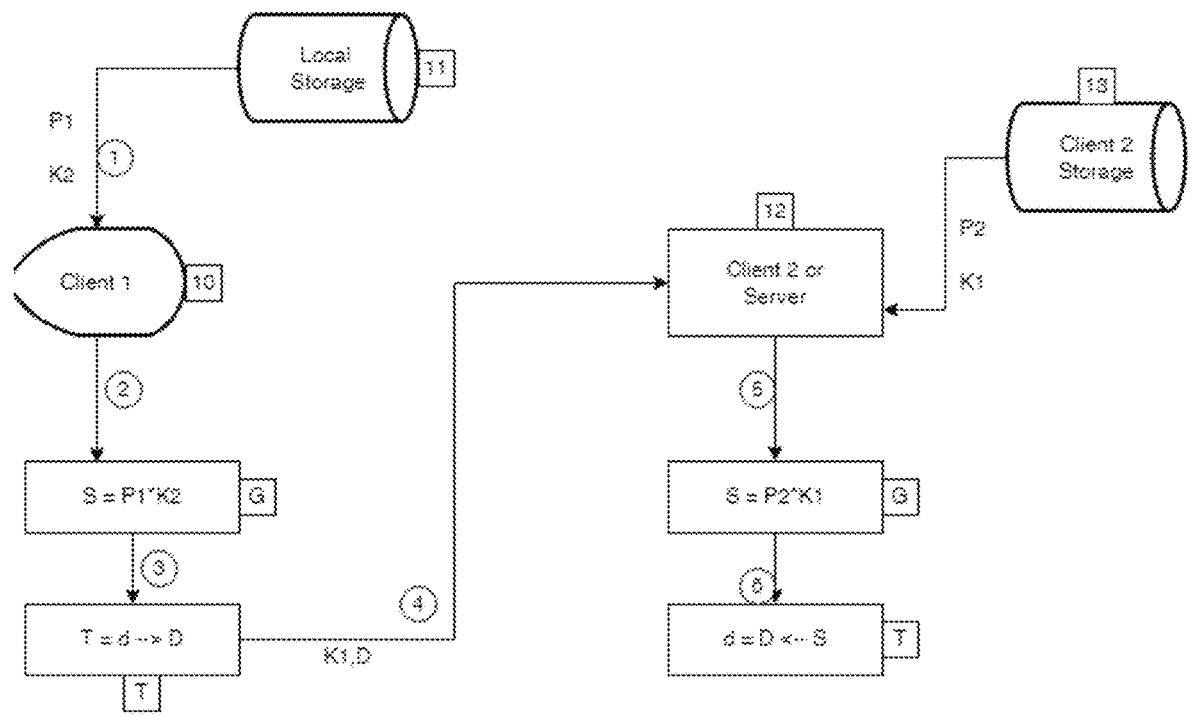
FIG. 1 is a schematic drawing evidencing an overview of one example of the system and method of symmetric keys disclosed herein.

This disclosure relates generally to cryptographic key systems using asymmetric, private and public security keys for commercial activities by providing for replacement of asymmetric key systems with symmetric key systems and elliptic curve systems.

Cryptographic keys may be used to exchange encrypted information in a secure manner. The users often desire to securely exchange the data without the possibility of a third party being able to intercept the data and recover the information. An example is an accounting firm that needs to share encrypted financial information with a client. The institution must first establish a trust relationship with the client then use the established trust relationship to send information securely.

The inventive system includes a feature(s) wherein multiple entities and persons can securely share the encrypted information. This embodiment relates to the formation and use of a private key from which an elliptic public key can be derived. The system as designed does NOT require the use of any current public key infrastructure, and is rather designed to provide each of a user and an enterprise with identical, symmetric, private keys. The system is unique and inventive in that the two entities can securely share information without a symmetric key exchange mechanism of any kind.

As generally known, computer cryptography uses integers for keys. In some cases, keys are randomly generated using a random number generator (RNG) or pseudorandom number generator (PRNG). A PRNG is a computer algorithm that produces data that appears random under analysis but which is reproducible given input restrictions.

In public key cryptography, a certificate authority or certification authority (CA) is an entity that stores, signs, and issues digital certificates for asymmetric keys. A digital certificate certifies the ownership of an asymmetric, public key by the named subject of the certificate. This allows others (relying parties) to rely upon signatures or on assertions made about the private key that corresponds to the certified public key. A CA acts as a trusted third party-trusted both by the subject (owner) of the certificate and by the party relying upon the certificate.

The clients of a CA are server supervisors who call for a certificate that their servers will bestow to users. Commercial CAs charge money to issue certificates, and their customers anticipate the CA's certificate to be contained within the majority of web browsers, so that perceived safe connections to the certified servers work efficiently out-of-the-box.

Use of certification authorities also requires the use of certificate revocation lists (CRL), used when a digital certificate has been revoked by the issuing CA before its actual or assigned expiration date. Online Certificate Status Protocol (OCSP) is being used to try and reduce the latency to check for revoke certificates, but they can also introduce privacy issues around leaking information about a person's browsing habits. When a CA is made aware that a private key has potentially been compromised, by a failure of an entity to adhere to policy requirements, misrepresentation of software behavior or another violation of CA policy by a user, the relevant key(s) may be revoked or put on a temporary hold until security of the key(s) can be confirmed. Revocation of keys requires generation, storage and sharing of new private keys, which is an inconvenience for users.

Symmetric keys, unlike private/public asymmetric key pairs, are generated by algorithms creating a single shared key without requiring employment of a CA. Symmetric systems also require substantially lower key lengths than public-key algorithms to resist brute-force attacks, and thus are substantially faster to use than asymmetric systems. In the inventive system, the symmetric key is generated directly by an algorithm downloaded to the client/user's device, thus obviating the need for a CA and the inconvenience of CRLs.

Advanced Encryption Standard (AES) is a specification for the encryption of electronic data established by the National Institute of Standards and Technology. The AES Encryption algorithm (also known as the Rijndael algorithm) is a symmetric block cipher algorithm with a block/chunk size of 128 bits. It converts these individual blocks using keys of 128, 192, and 256 bits. Once it encrypts these blocks, it joins them together to form a ciphertext.

One embodiment of the inventive system begins with the first client using a first client device comprising either a personal mobile device, a tablet or a personal computer and wanting to set up a secure transaction with a second client, wherein the following steps occur:

Step 1, the first client retrieves the first client's private key (P1) and the public key of the second client (K2) from the first client's storage device.

Step 2, the first client uses a symmetric key generation algorithm (G) to form a symmetric key (S) from the product of their private key and the public key. Specifically, the symmetric key will be derived from the point on the elliptic curve produced by multiplying the private key by the public key. A suitable symmetric key would be the 32 byte hash of the concatenated x and y coordinates of the point.

Step 3, the symmetric key is used by the first client in any symmetric encryption algorithm. As an example, the key could be used to initialize an instance of the AES algorithm and then use this substantiation to encrypt the data (d).

Step 4, the encrypted data is sent to the recipient by any means available. Using the Internet would be one example of transport.

Step 5, the recipient retrieves their private key and the public key of the sender and generates a symmetric key from the product of their private key and the public key of the sender. The derivation methodology must match the methodology of the sender.

Step 6, the recipient uses this symmetric key to decrypt the incoming message and recover the information that was intended solely for their use.

The term client is used herein to describe any person or entity using the inventive system. Clients may be individual users, commercial or public service providers or other entities, or any other person or corporate entity using the system. In a primary embodiment, the first client is an individual user and the second client is a corporate entity with whom the first client is sharing encrypted data.

One advantage of the disclosed system is that a user need not negotiate or store a shared secret key or associated piece(s) of confidential information to exchange information securely, since each client can independently generate an identical symmetric key.

In an alternate method, wherein the public key of the second client device/server is embedded in an application downloaded to the first client device, the following steps are used:

1. The public key of the server is embedded in an application that needs to communicate with the server;
2. The client forms a random private key and an associated elliptic curve public key;
3. The client computes a key from the embedded public key and the computed private key;
4. The client encrypts data using the symmetric key;

5. The client sends the computed public key and the data to the server;
6. The server can form a key from its private key and the incoming public key;
7. The server decrypts the data using the computed symmetric key.

This alternate method, by embedding the second client public key into the application, provides additional security benefits. The embedded public key can be retrieved by the application when it is loaded and then used to generate symmetric keys which are unique to the server. Embedding the public key in the app removes the possibility of "Phishing" and "man-in-the-middle" attacks. If the public key is somehow compromised in the app, then the app signature will change and become unusable. This embodiment is functionally the same as other embodiments described herein except the process can be accomplished in one simple step.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept. The invention illustratively disclosed herein suitably may be practiced in the absence of any element which is not specifically disclosed herein.

DETAILED DRAWING DESCRIPTION

FIG. 1 is a schematic drawing evidencing an overview of one example of the system and method of creating symmetric keys disclosed herein. In FIG. 1, first client device 10 retrieves first client private key P1 and second client public key P2 from first client local storage 11. Utilizing first client's private key P1 and second client's public key K2, symmetric key S is generated. Then, utilizing the symmetric key S and symmetric key algorithm T, data d is encrypted and sent to second client device 12.

FIG. 1 further shows second client device 12 retrieving second client private key P2 and first client public key K1 from second client storage 13. Utilizing second client private key P2 and first client public key K1, the second client device 12 executes symmetric key generation algorithm G to create symmetric key S, which is identical to the key generated by the first client device. Second client device 12 then uses symmetric key encryption algorithm T to de-encrypt data d.

Figure 2:
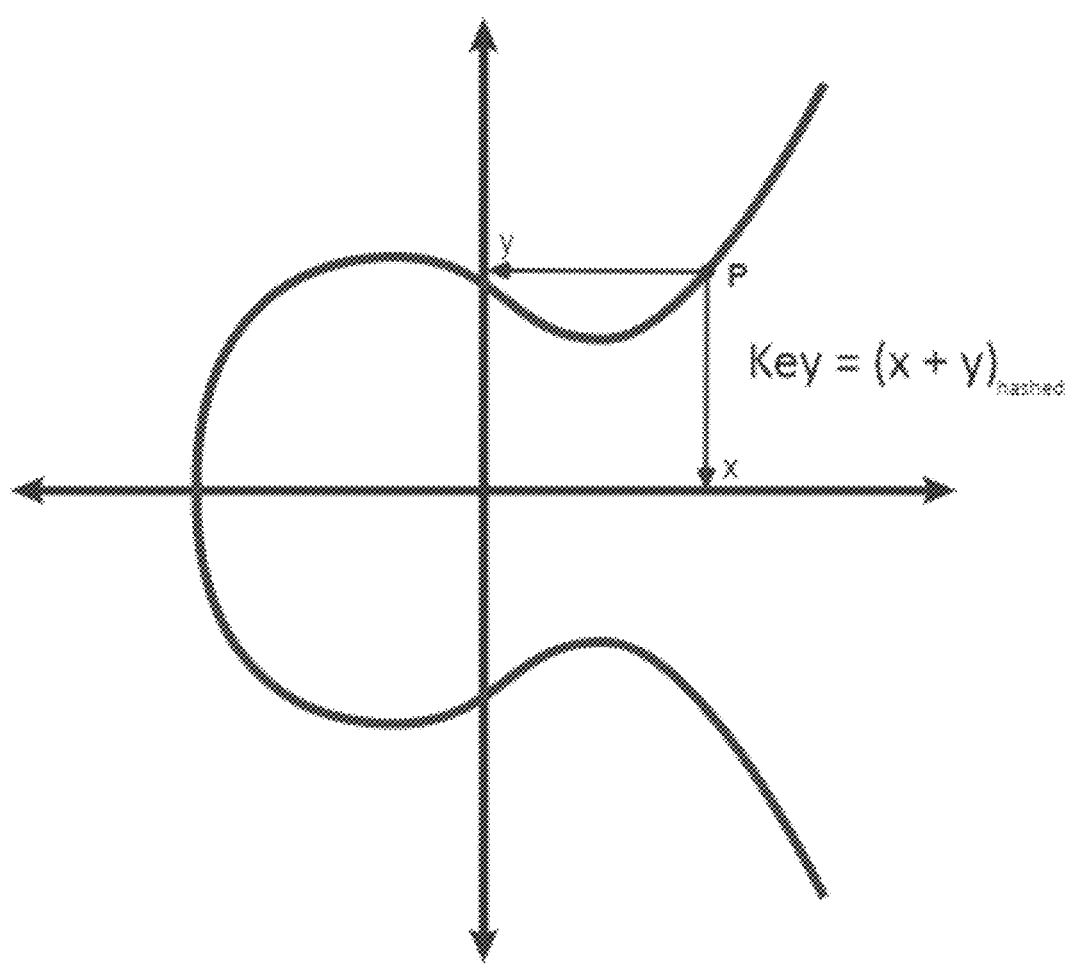
FIG. 2 is a graph illustrating a symmetric key as the 32 byte hash of concatenated x and y coordinates of a point.

FIG. 2 is a graph illustrating a symmetric key as the 32 byte hash of concatenated x and y coordinates of a point.

INDEX OF PARTS FIG. 1

10 First client device
11 First client local storage
12 Second client device/server
13 Second client/Server storage
P1 First client private key
K1 First client public key
P2 Second client private key
K2 Second client public key
S Symmetric key
d Data (encrypted)
G Symmetric key generation algorithm
T Symmetric key encryption algorithm The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A system for generating a symmetric key to be used to encrypt data to be shared by a first client and a second client, the system comprising:
   a first client device with a memory, a processor and an associated local storage;
   a second client device with a memory, a processor and an associated storage;
   a symmetric key generating algorithm and a symmetric key encryption algorithm, each located on the first client device memory and the second client device memory;
wherein the system executes the following steps;
   1. entering a first client private key and a second client public key into the symmetric key generating algorithm on each of the first client device memory and second client device memory to independently generate the same symmetric key on each device, wherein the symmetric key is derived from a point on the elliptic curve produced by multiplying the first client private key by the second client public key wherein the symmetric key is derived from a point on the elliptic curve produced by multiplying the first client private key by the second client public key;
   2. securely storing the second client public key on the remote repository;
   3. using the symmetric key encryption algorithm on the first client device to encrypt data;
   4. sending the encrypted data from the first client device to the second client device;
   5. retrieving the second client private key and the first client public key from the second client storage with the second client device; and
   6. decrypting the encrypted data using the symmetric key encryption algorithm on the second client device.

2. The system of claim 1, wherein the symmetric key is derived from a point on the elliptic curve produced by multiplying the first client private key by the second client public key.

3. The system of claim 2, wherein the symmetric key is a 32-byte hash of concatenated x and y coordinates of the point.

4. The system of claim 1, wherein step 4 is accomplished using an Internet, an intranet, wired or wireless transfer or a similar known means of electronic data transport.

5. The system of claim 1, wherein the second client device is a server.

6. A method of using the system of claim 1, wherein the system executes the following steps:
   1. Retrieving a first client private key and a second client public key from a first client local storage with a first client device;

2;
3. Using the symmetric key in a symmetric encryption algorithm stored on the first client device memory to encrypt data;
4. Sending the encrypted data from the first client device to the second client device via an Internet, an intranet, wired or wireless transfer or a similar known means of electronic data transport;
5;
6. Generating the symmetric key with the second client device as in step 2, wherein the derivation methodology matches the methodology of the first client; and
7. Using the symmetric key on the second client device to decrypt the incoming message from the first client and thus access the encrypted data.

7. The method of claim 6, wherein the symmetric key is a 32-byte hash of concatenated x and y coordinates of the point.

8. The method of claim 6, wherein step 3 is embodied as using the symmetric key to initialize an instance of an AES algorithm and thereby encrypting data.

9. A method of using the system of claim 1, also comprising a mobile application stored in the memory of the first client device, wherein the system executes the following steps: 1. Embedding a second client public key into the application on the first client device; 2. Computing a random first client private key and an associated elliptic curve second public key with the application on the first client device; 3. Computing a symmetric key from the embedded second client public key and the computed random first client private key with the application on the first client device; 4. Encrypting data with the application using the symmetric key; 5. Sending the computed public key and the encrypted data to the second client device associated with the second client public key; 6. Computing a symmetric key from the second client private key and the incoming first client public key with a copy of the application located on the server; and 7. Decrypting the encrypted data using the computed symmetric key on the second client device.

10. The method of claim 9, wherein the mobile application contains the embedded second client public key at the time it is downloaded to the memory of the first client device.

11. The method of claim 9, wherein step 5 is accomplished using an Internet, an intranet, wired or wireless transfer or a similar known means of electronic data transport.

* * * * *